Figure 5:
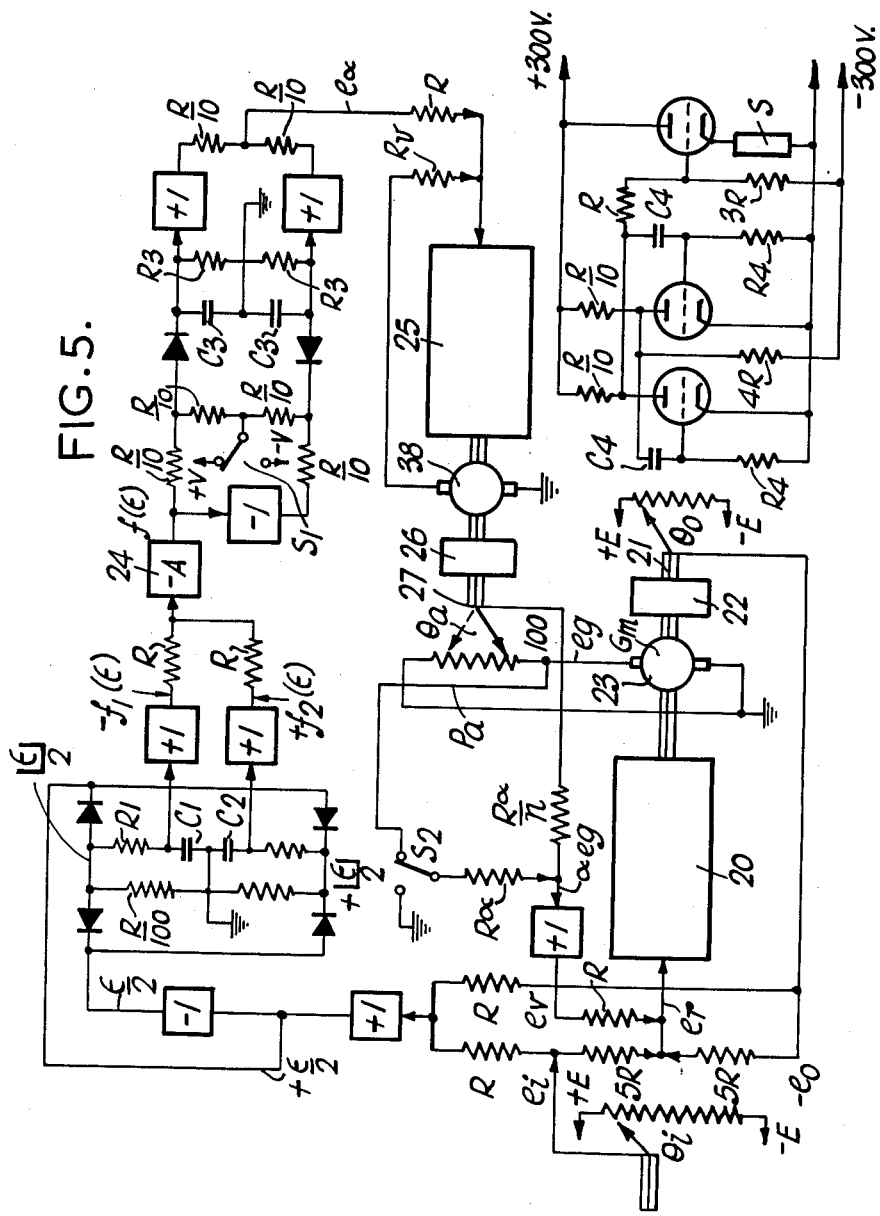

July 2, 1963  W. K. TAYLOR  3,096,471
OPTIMIZING AUTOMATIC CONTROL SERVOSYSTEM
Filed Oct. 7, 1960  5 Sheets-Sheet 1
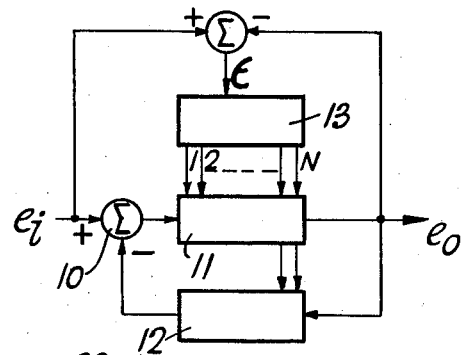
FIG.1.
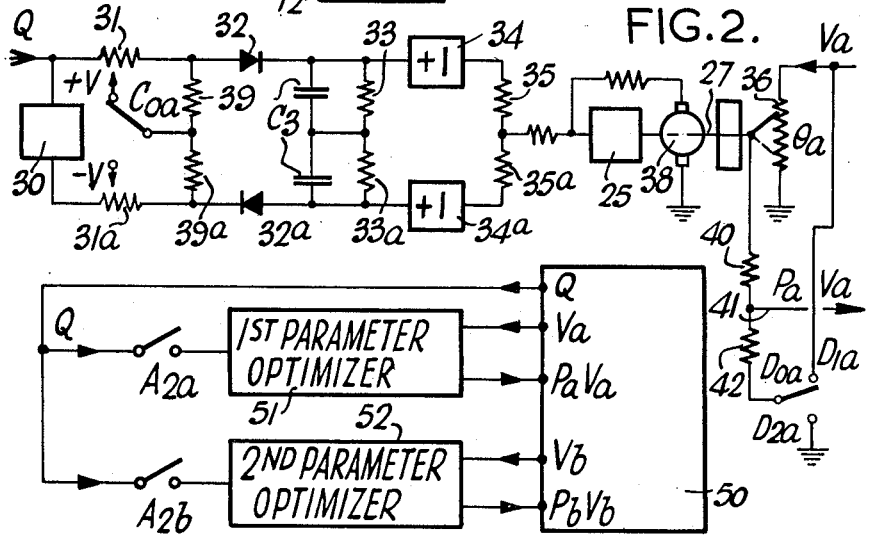
FIG.2.
FIG.3.
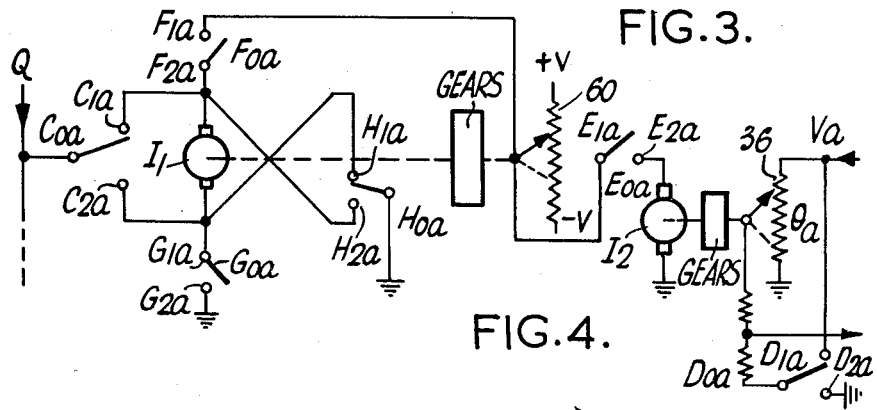
FIG.4.

United States Patent Office 3,096,471
Patented July 2, 1963

3,096,471
OPTIMIZING AUTOMATIC CONTROL SERVOSYSTEM
Wilfred Kenelm Taylor, Richmond, England, assignor, by mesne assignments, to International Business Machines Corporation, a corporation of New York
Filed Oct. 7, 1960, Ser. No. 61,285
Claims priority, application Great Britain Oct. 16, 1959
11 Claims. (Cl. 318—448)

This invention relates to automatic control systems. It is applicable both to so-called closed loop systems, in which information from the controlled element is fed back to the input of the system to form a closed signal loop, as well as to so-called open loop systems, in which parameters of the system are controlled so as to maintain or endeavour to maintain a desired pattern of behaviour in response to variations occurring at the input end of the system.

One example of a system of the closed loop type is a position servo system in which the position of a controlled element is required to reproduce the position of a controlling member. In such a system the forward part of the loop comprises an amplifier which is used to drive a motor, which turns a shaft, which is the output of the system. From the output end there may be fed back to the input signals representing the actual position of the output element, its speed and possibly also its acceleration. These signals are subtracted from a signal representing the required position of the output element so that a difference signal is derived which is used as input to the amplifier in the forward part. The behaviour of such a system depends, of course, upon a number of behaviour-determining parameters and the band-widths of the forward and feed-back paths and their gain and attenuations respectively must be chosen accordingly so that the system will have the requisite "stiffness" and freedom from instability.

An example of a system of the second kind would be a process plant in which the raw material introduced at the input end is carried through a number of process steps to produce a finished product at the output end. It may be, for example, a chemical process and it may be desired for example, to control the speed of flow of a reagent introduced at some stage so as to produce an optimum yield at the output end despite fluctuations in the quality of raw material introduced at the input end. In such a system also it is, of course, necessary to have regard to the rates of throughput of the system, the sensitivity of the system to external effects such as ambient temperature variations and so on, in order to determine the time constants, sensitivities and so forth of the elements controlling the particular parameter of the process which is to be used to regulate the uniformity of the output. Other examples of parameters affecting the behaviour of such a system, besides rates of flow and temperatures, are pressures, treatment times and so forth.

In general it is usual to design any such system for the control of a multi-stage process for example on the basis of the known ranges of such parameters, the expected wave forms according to which the input may vary and various assumptions are usually made to simplify the mathematics and to enable the system to be designed so that it will be stable in all the expected circumstances as well as complying with certain requirements of performance under all expected conditions of input signal. It follows that invariably in designing such a system some compromise has to be achieved and it follows that the parameters are not necessarily designed for optimum performance in all circumstances. This is increasingly so in the case of systems involving a number of independent parameters which make the mathematics difficult, if not impossible.

The above can be summed up by saying that in optimising the design of any control system it is usual to base the design on statistical procedures which require the inputs to be statistically stationary processes of known spectra, that is to say, to be expressed in the form of predetermined frequency spectra. The system is often assumed to be linear and a measure of performance that simplifies the mathematics is chosen.

In many practical applications, however, optimum operating parameters depend on the waveforms of the input signals or noise and the input signals are not only statistically non-stationary but are from time to time of sufficient amplitude to drive the system into non-linear operation. It is therefore impossible to predetermine the optimum parameters.

An object of the present invention is to provide, in a control system, apparatus for optimising the various parameters of the system automatically.

A further object of the invention is to provide in a control system means for optimising the, or some of the, parameters progressively from time to time so as to maintain optimum performance of the system in changing circumstances.

Further objects of the invention will appear hereinafter.

According to the invention in one aspect, there is provided in a control system the response of which is required to be optimised and which includes at least one controllable parameter, means for controlling said one parameter comprising means for producing periodically small variations in the value of said parameter about a mean value, means for deriving a signal defining the sense in which the system responds to each said small variation and means responsive to a signal so derived for changing the mean value of said parameter in the appropriate sense to influence said response towards optimum behaviour.

In order that the invention may be more clearly understood it will now be described with reference to the accompanying drawings in which:

FIGURE 1 illustrates in generalised form a feed back control system to which the invention is applied, FIGURE 2 illustrates one form of basic circuit for optimisation of a parameter, FIGURE 3 illustrates in block schematic form the application of the system to control of two parameters of a process, FIGURE 4 illustrates a modified form of circuit for optimisation of a parameter, FIGURE 5 illustrates one embodiment of a closed loop automatic control system in which one parameter value is optimised according to the invention, FIGURES 6 to 9 illustrate various operational characteristics determined in connection with the embodiment of FIGURE 5, and FIGURE 10 illustrates the output waveform of part of the embodiment of FIGURE 5 and how this may be employed to take account of the control of N parameters.

The feedback loop of the system illustrated in FIGURE 1 has input and output signals $e_i$ and $e_o$ which are applied to a difference circuit 10. The system takes account of a set of N parameters distributed in the forward path 11 and the feedback path 12 and these parameters will be denoted by $\alpha_1, \alpha_2, \ldots \alpha_n$.

The only restriction placed on these parameters is that they should range between zero and maximum values. It is convenient in practice to normalise them so that all lie in the range 0 to 1, where 1 corresponds to the maximum value in each case.

The parameter values will normally be determined by the values of resistors, capacitors and inductors, and may, for example, take the form of velocity feedback, acceleration feedback, frequency bandwidths and non-linear transfer characteristics. Since each of these parameters can have some effect on the difference between $e_i$ and $e_o$, that is, the actual error $e$ of the feedback loop, a signal representing this actual error can be expressed as $$e = f_0(e_i, \alpha_1, \alpha_2, \ldots \alpha_n)$$

A signal representing the measure of error chosen for optimisation, that is, minimisation or maximisation, is derived from the actual error signal $e$ and will be denoted by $f_2(e)$. Hereinafter, optimisation will be described as minimisation of a measure of error although clearly a similar procedure may be adopted for maximisation.

This signal $f_2(e)$ is applied to a parameter controller 13 which is required to set the parameters to the values which make $f_2(e)$ a minimum for the input signal $e_i$. This is clearly not practicable if $e_i$ is a single transient which terminates before the parameter controller can operate and even if it were possible to optimise the parameters towards the end of a transient this would be useless if the next transient required a different set of parameter values for optimisation. Also, if the input signal is non-stationary the significant features thereof may change with time so that if the parameters are to be correctly re-adapted information relating to past features must be discarded.

Thus, the signal $f_2(e)$ is formed by integration over a period that is sufficient to smooth out rapid fluctuations of $|e|$.

The optimisation of the measure of error $f_2(e)$ is achieved by means of circuits which approximate the partial derivatives of $f_2(e)$ with respect to the parameters. These, estimates, denoted by $$\frac{\Delta f_2}{\Delta \alpha_1}, \frac{\Delta f_2}{\Delta \alpha_2}, \ldots \frac{\Delta f_2}{\Delta \alpha_n}$$

are used according to their magnitudes and signs to control the rate of change of the corresponding parameter values.

The approximate equation of change for the first parameter for minimising $f_2(e)$ is then $$\frac{d\alpha_1}{dt} = -C_1 \frac{\Delta f^2}{\Delta \alpha_1}$$

where $C_1$ is a positive constant.

Thus, when the slope of the $f_2$, $\alpha_1$ characteristic is positive the value of $\alpha_1$ is decreased and when this slope is negative the value of $\alpha_1$ is increased. Only when the slope is zero is $\alpha_1$ maintained steady at its optimum value with the remaining $N-1$ parameter values held steady.

The discussion will be restricted for the present to optimisation of one parameter value, $\alpha$, the case involving optimisation of all of the N parameters being discussed hereinafter. The value of parameter $\alpha$ is changed periodically by an increment $\Delta \alpha$ at a rate which permits a number of corresponding samples of incremental changes $\Delta f_2(e)$ to be obtained in the region of the average working point of $f_2(e)$. This automatic sampling technique is similar to the manual method of detecting in which direction of rotation of a knob reduces the mean reading of a fluctuating quantity displayed on a meter. In the latter meter the knob is moved short distances in either direction and the results are compared before a decision to continue in one direction or the other is taken.

In a similar way the invention in one embodiment consists in sampling the effects on $f_2(e)$ of two parameter values differing by a fixed increment to find in which direction the parameter value should be changed to reduce $f_2(e)$. Thereafter, the parameter value is changed by an amount corresponding to the observed effect on $f_2(e)$ and a further sampling is then carried out.

In the application of the invention to open loop systems the same fundamental considerations apply. However, in this case the "error signal" is replaced by an input signal which is a measure of the effect, output or whatever it may be that is to be optimised, i.e. maximised or minimised. The parameter which is to be controlled is varied periodically as before to determine the sign of the slope of this input signal as it varies under the influence of the periodical variation of the parameter and the mean setting of the parameter is changed in accordance with the slope thus detected.

FIGURE 2 shows the basic circuit of a parameter optimising system according to the invention. A signal Q representing the condition to be optimised is supplied to the input. The signal is inverted in circuit 30 and to the positive and negative versions is added a reference signal formed by reversing switch $C_{oa}$ between voltages $+V$ and $-V$. The sums are applied to two peak rectifier circuits, consisting of rectifiers 32 and 32$a$, reservoir condensers $C_3$ and leak resistors 33 and 33$a$. The outputs from the two rectifiers are applied through buffer amplifiers 34 and 34$a$ to resistors 35 and 35$a$, at the junction of which the sum of these outputs is obtained to provide an input signal for an amplifier and motor 25 which through its output shaft 27 drives a potentiometer 36. Velocity feed-back is provided by a tachometer generator 38.

Across the potentiometer 36 is applied a voltage $V_a$ which represents the maximum value which the parameter to be controlled may have so that the wiper arm of potentiometer 36 picks off a voltage which is a proportion of $V_a$. This voltage is applied through resistor 40 to a line 41 which controls the parameter. The signal over the line 41 might, for example, be the velocity feedback signal of a position servo system as described in an example below. On the other hand, it could be used to set the position of a mechanical device controlling some part of a chemical process for example. The lower end of resistor 40 is also connected through a resistor 42 to a switch $D_{oa}$, the two poles $D_{1a}$ and $D_{2a}$ of which are connected to voltage $V_a$ and earth respectively. Switch $D_{oa}$ is operated synchronously with switch $C_{oa}$ referred to above.

The signal voltage appearing on the line 41 may be regarded as representing the mean value at which the parameter to be controlled is, for the time being, set. When the switch $D_{oa}$ is in its upper position then the voltage on line 41 is raised by an amount determined by the relative values in the potentiometer chain consisting of resistors 42, 40 and the lower part of potentiometer 36. When the switch is in its lower position the voltage on the line 41 is reduced by an amount which depends upon the relative values of the resistors in the chain consisting of the upper part of potentiometer 36, resistor 40 and resistor 42. In this way the voltage on line 41 is varied periodically about its mean so as to vary periodically the value of the parameter controlled by this voltage. The effects thus produced upon the behaviour of the system appear as variations in the input signal applied at say $+\Delta Q$ and $-\Delta Q$. The signals appearing at the outputs of the two peak rectifiers are, therefore $$+V \pm \Delta Q \text{ and } -V \pm \Delta Q$$

where the positive and negative signs are taken according to whether Q increases or decreases when the reference signal and the parameter control signal increases as switches $C_{oa}$ and $D_{oa}$ operate. It will now be seen that the sum signal appearing at the junction of resistors 35 and 35$a$ represents in sign and magnitude the rate at which Q varies with variations of the controlled parameter about its present setting. Applied as an input signal to amplifier 25, it causes the potentiometer arm of potentiometer 36 to be driven in the appropriate direction to increase or decrease the signal voltage on line 41 according to the direction in which the signal at Q changed when the voltage on line 41 was changed. The sense is, of course, chosen so that Q is caused to move towards the desired optimum be it a maximum or a minimum. It follows that when the variations in the signal on line 41 no longer produce variations in the level of the signal at Q, that is to say when the slope of the variations at Q becomes zero, potentiometer 36 will remain at rest and the parameter controlled by the circuit may be regarded as set to its optimum.

FIGURES 3 and 4 illustrate how a circuit of the kind described with reference to FIGURE 2 may be applied to the control of two parameters in a system of process control. In FIGURE 3 the rectangle 50 represents a complex which may be any kind of plant carrying out a process, or system performing some function the efficiency or accuracy of which may be measured and represented by a signal which appears at Q. For each parameter to be optimised there is provided an optimising equipment 51 and 52 respectively. A voltage $V_a$ representing the maximum value of parameter A is applied to parameter optimiser 51 and the signal Q is applied to 51 through a switch $A_{2a}$. A control signal from 51 is applied to the parameter controlling device in the controlled complex, whatever it may be, at $P_aV_a$. It may be regarded as a proportion of the maximum signal $V_a$. In the same way the voltage $V_b$, related to a second parameter, is applied to parameter optimiser 52, the Q signal is applied to 52 through switch $A_{2b}$ and the output from 52 represented by $P_bV_b$ is applied to the control of the second parameter whatever it may be. The following table shows how the switches $A_{2a}$, $C_{oa}$ and $D_{oa}$ associated with the first parameter optimiser 51 and $A_{2b}$, $C_{ob}$ and $D_{ob}$ are controlled.

|  | Switch 1 | Switch 2 | Switch 3 | Switch 4 | Switch 5 |
|---|---|---|---|---|---|
| Position 1 | Q to $A_{2a}$ | +V to $C_{oa}$ | --------------- | $D_{oa}$ to $D_{1a}$ | --------------- |
| Position 2 | Q to $A_{2a}$ | −V to $C_{oa}$ | --------------- | $D_{oa}$ to $D_{2a}$ | --------------- |
| Position 3 | Q to $A_{2b}$ | --------------- | +V to $C_{ob}$ | --------------- | $D_{ob}$ to $D_{1b}$ |
| Position 4 | Q to $A_{2b}$ | --------------- | −V to $C_{ob}$ | --------------- | $D_{ob}$ to $D_{2b}$ |

It will be noticed that each optimiser is brought into operation in turn and its switches operated so that it will readjust itself towards its optimum setting. The speed at which the system operates will, of course, depend upon the time constants of the apparatus or plant under control and the considerations which apply will be more fully described in relation to the example given below with reference to FIGURE 5.

It may be that the process or apparatus to be controlled operates on a time scale which is too slow for a system such as has been illustrated in FIGURE 2 to operate satisfactorily owing to the limitations which apply to integration by means of resistance/capacity networks. In FIGURE 4 is illustrated a modified circuit using integrating motors which may be used for slowly moving systems. In FIGURE 4 the integrating motor $I_1$ controls, through gearing, the arm of a potentiometer 60. The voltage picked off from potentiometer 60 by its moving arm is applied through switch $E_{oa}$ to a second integrating motor $I_2$ which through gearing drives the parameter-controlling potentiometer 36. The signal Q is applied through switch $C_{oa}$ to integrator motor $I_1$, first in the one sense and then in the reverse sense according to the positions occupied by switches $C_{oa}$ and $H_{oa}$. The motor is thus driven first in the one direction and then in the reverse direction so that its final position represents an integrated version of the change in the signal Q during the sampling time and thus represents the slope of the variation in Q which is taking place at the time, due to the reversal of switch $D_{oa}$. This voltage is then applied to integrating motor $I_2$. Unless the value of Q did not change during the sampling time $I_2$ will experience a voltage which drives it in one direction or the other to vary the setting of potentiometer 36 in the right direction to influence the controlled system or process to reduce the slope of the signal at Q.

After each re-setting the integrator motor $I_1$ must be returned to zero and this is effected by closing the switches $F_{oa}$ and $G_{oa}$ so that the motor homes to its zero setting, that is to say, when the arm of potentiomeer 60 is returned to its mean position which is earth.

The switching sequence for the switches $C_{oa}$, $D_{oa}$, $E_{oa}$, $F_{oa}$, $G_{oa}$, and $H_{oa}$ is given in the following table. For a system employing two parameter controllers of the kind illustrated in FIGURE 4 a bank of six 4-position switches is used for each parameter optimiser.

GANG 1

| Switch No. | Position 1 | Position 2 | Position 3 | Position 4 |
|---|---|---|---|---|
| 1 | $C_{oa}$ to $C_{1a}$ | $C_{oa}$ to $C_{2a}$ | --------------- | --------------- |
| 2 | $H_{oa}$ to $H_{1a}$ | $H_{oa}$ to $H_{2a}$ | --------------- | --------------- |
| 3 | --------------- | --------------- | $E_{oa}$ closed | --------------- |
| 4 | --------------- | --------------- | --------------- | $F_{oa}$ closed |
| 5 | --------------- | --------------- | --------------- | $G_{oa}$ closed |
| 6 | $D_{oa}$ to $D_{1a}$ | $D_{oa}$ to $D_{2a}$ | --------------- | --------------- |

GANG 2

| | Position 1 | Position 2 | Position 3 | Position 4 |
|---|---|---|---|---|
| 1 | --------------- | --------------- | --------------- | $C_{ob}$ to $C_{1b}$ | $C_{ob}$ to $C_{2b}$ |
| 2 | --------------- | --------------- | --------------- | $H_{ob}$ to $H_{1b}$ | $H_{ob}$ to $H_{2b}$ |
| 3 | --------------- | $E_{ob}$ closed | --------------- | --------------- |
| 4 | --------------- | --------------- | $F_{ob}$ closed | --------------- |
| 5 | --------------- | --------------- | $G_{ob}$ closed | --------------- |
| 6 | --------------- | --------------- | --------------- | $D_{ob}$ to $D_{1b}$ | $D_{ob}$ to $D_{2b}$ |

Naturally if further parameter optimisers were provided the number of switch positions would have to be increased so that the various functions of the optimisers could be interlaced in the appropriate manner.

FIGURE 5 shows, by way of illustration the application of the invention to a position control system for the purpose of optimising the velocity feedback. The system comprises an amplifier and motor 20 responsive to an input signal $e_i$ representing an angle $\theta_i$ to drive an output shaft 21 via gears 22 so as to follow the input signal. The actual output shaft position is denoted by $\theta_0$ and a signal $e_0$ representing this angle is fed back and subtracted from the input signal $e_i$ to produce a signal $e$ representing the actual error. A velocity feedback signal $e_g$ is also derived from a tachometer 23 between the motor 20 and gears 22, a proportion of which signal is added to the actual error signal, as hereinafter described, to form a drive signal input $e_r$ to the amplifier and motor.

A signal $f(e)$ is derived from the actual error by subtraction of two signals of the form $$f(e)=\frac{1}{T}\int_0^t |e|(t-\tau)\theta\frac{\tau}{T}d\tau$$

One signal $f_1(e)$ representing this function is derived by passing the full wave rectified value of $e$ through the low pass filter comprising resistor $R_1$ and capacitor $C_1$ with a time constant $T_1=R_1C_1$, and a further signal $f_2(e)$ representing this function is derived by passing the full wave rectified value of $e$ through the low pass RC filter consisting of resistor $R_2$ and capacitor $C_2$ with a time constant $T_2=R_2C_2$, as shown, where $T_2>T_1$.

The signals $f_1(e)$ and $f_2(e)$ represent an average of the modulus of the actual error composed of frequency components above frequencies $$W_1=\frac{1}{T_1} \text{ and } W_2=\frac{1}{T_2}$$

respectively. It will be seen that these signals have the same mean value but that $f_1(e)$ contains higher frequency components of $|e|$. The changes to be made in the value of the controlled parameter (velocity feedback) must give rise to frequency components of $|e|$ below $W_1$ and above $W_2$ and it is convenient to make these changes in the form of a square wave with a fundamental frequency $W_s$ that falls between $W_1$ and $W_2$. Low frequency components of $|e|$ are not required for the estimation of $$\frac{\Delta f_2}{\Delta \alpha}$$

since they do not vary appreciably with $\Delta \alpha$. They are therefore eliminated by forming the signal $$f(e) \alpha f_1(e) - f_1(e)$$

It will be seen that in fact a signal $f_2(e) - f_1(e)$ is formed and passed through an inverter and amplifier 24 to form $f(e)$.

The small increments in parameter value $\Delta \alpha$ are controlled by a square wave generator in the form of a free running multi-vibrator such as shown in the lower right hand corner of FIGURE 5. A relay S with two single pole change-over switches $S_1$ and $S_2$ (corresponding to $C_{oa}$ and $D_{oa}$ respectively in the previous examples) is driven by this generator so that the switches are set alternately into each of their two possible positions for $T_s$ seconds.

A parameter control signal $e\alpha$ proportional to $$\frac{\Delta f}{\Delta \alpha}$$

is obtained as before by adding to $f(e)$ and $-f(e)$ a reference signal, formed by the switching of $S_1$ between terminals connected to voltage sources V and $-V$ and applying the sums to two peak rectifiers. The signal $f(e)$ thus produced varies about zero by average amounts $\pm \Delta f$ as the reference signal changes by $\pm V$ but it may be in or out of phase with the reference signal. The peak positive voltage applied to the peak positive rectifier and the peak negative voltage applied to the peak negative rectifier are respectively $$V \pm \Delta f \text{ and } -V \pm \Delta f$$

where the positive and negative signs are taken according to whether $f(e)$ increases or decreases when the reference signal and $\alpha$ increase.

The parameter control signal $e_a$ is obtained by adding these rectifier outputs and is proportional to and of the same sign as $$\frac{\Delta f}{\Delta \alpha}$$

since $|\Delta \alpha|$ is constant.

It will be noted that the same result is obtained if $f(e)$ has a non-zero mean or if $f_1(e)$ is supplied to the circuit instead of $f(e)$. The mean value cancels out and the main reason for taking the difference between $f_2(e)$ and $f_1(e)$ is to prevent overloading of the amplifier 24 by large working point errors.

The parameter control signal $e_a$ is applied to a control amplifier and motor 25 of low power to decrease or increase via gears 26 the angle $\theta_a$ of an output shaft 27 depending on whether $e_a$ is positive or negative. This parameter controller employs a velocity feedback signal provided by a tachometer 38.

The angular position $\theta_a$ of output shaft 27 determines the position of the wiper contact on a variable resistor $P_a$ in the velocity feedback path of the position control system, as shown.

In the determination of the velocity feedback applied to the position control system a signal $e_g$ is generated by tachometer 23 and applied to resistor $P_a$, a proportion K of this signal appearing at the wiper contact. As the angular position of $\theta_a$ varies from 0 to 100 units the value of K varies from 0 to 1.

There are two initial feedback paths for the tachometer output signal $e_g$, as shown, one being via the variable resistor wiper contact and a resistor $R_a/n$ and the other via a resistor $R_a$. The resistor $R_a$ is switched by the second switch $S_2$ associated with the square waveform generator between the tachometer output and earth and so produces changes of velocity feedback. The transfer function of the variable resistor $R_a$ is denoted by $K = f_a(\theta_a)$ and the overall transfer function from the tachometer output to the signal point $e_v$, after the rejoining of the two initial feedback paths, is denoted by $\alpha$. For any fixed value of $\theta_a$ and K there are two values of $\alpha$ corresponding to the two positions of switch $S_1$. These two values are $$\alpha_h = \frac{K_n}{n+1} + \frac{1}{n+1} \text{ and } \alpha_l = \frac{k_n}{n+1}$$

from which $$\alpha = \alpha_h - \alpha_l = \frac{1}{n+1}$$

This change in $\alpha$ could also be produced, although not so conveniently, by a change in K of $1/n$.

A zero value of the parameter control signal $e_a$ is obtained and $\theta_a$ remains constant when $f_2(e)$ is constant or zero.

Figure 7:
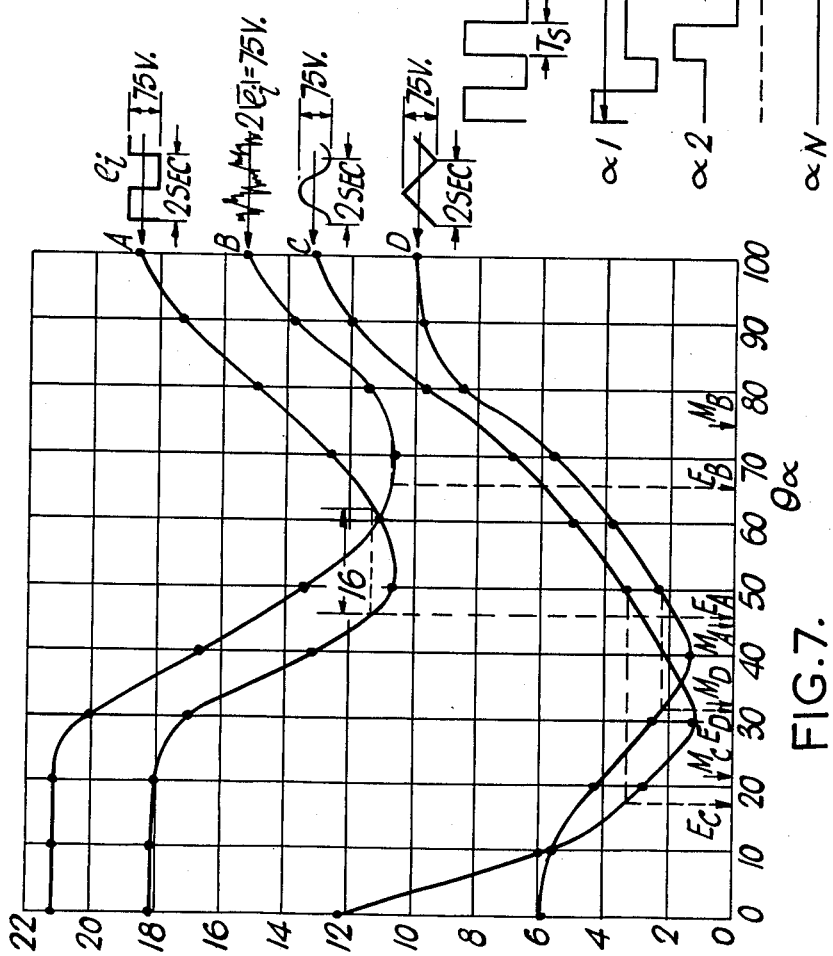

In one example of the above embodiment A-square waveform, B-random waveform, C-sinusoidal waveform and D-triangular waveform test input signals were employed and the corresponding values of $f_2(e)$ for these inputs are shown in FIGURE 7. The cycle times of waveforms A, C, and D were each 2 seconds.

The time constant $T_2 = R_2C_2$ was increased until reasonably steady readings of $f_2(e)$ were obtained on a moving coil meter for these input signals. The value thus derived for $T_2$ was 10 seconds.

Figure 6:
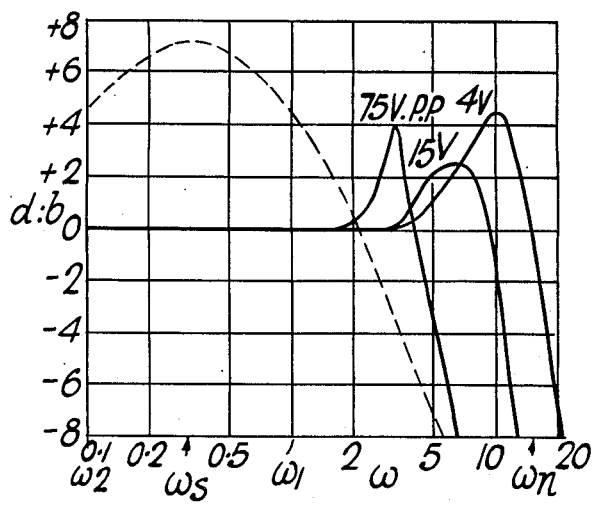

The duration of each parameter change must be related to the frequency response of the main control system which depends on the degree of saturation. Three measured frequency response characteristics for different amplitudes of input and fixed velocity feedback are shown in FIGURE 6. The peaks of these responses are all below the theoretical linear operation value of $W_n = 15$ and it is clear that any linear analysis is inapplicable for this region.

Most of the modulus of error was expected to be due to frequency components above $W_1 = 1$ so that the average of these components was obtained with the low pass filter $R_1C_1$ for which the time constant $T_1$ was made 1 second.

The value of $W_s$ taken for the sampling frequency was $1/\sqrt{10} = 0.316$ and can be seen from FIGURE 6 to be at the centre of the resultant filter characteristic shown by the dotted line. The sampling time of approximately 10 seconds is half the period of the square wave and represents the time for which $\alpha$ is changed by $\Delta \alpha$.

Figures 8, 9:
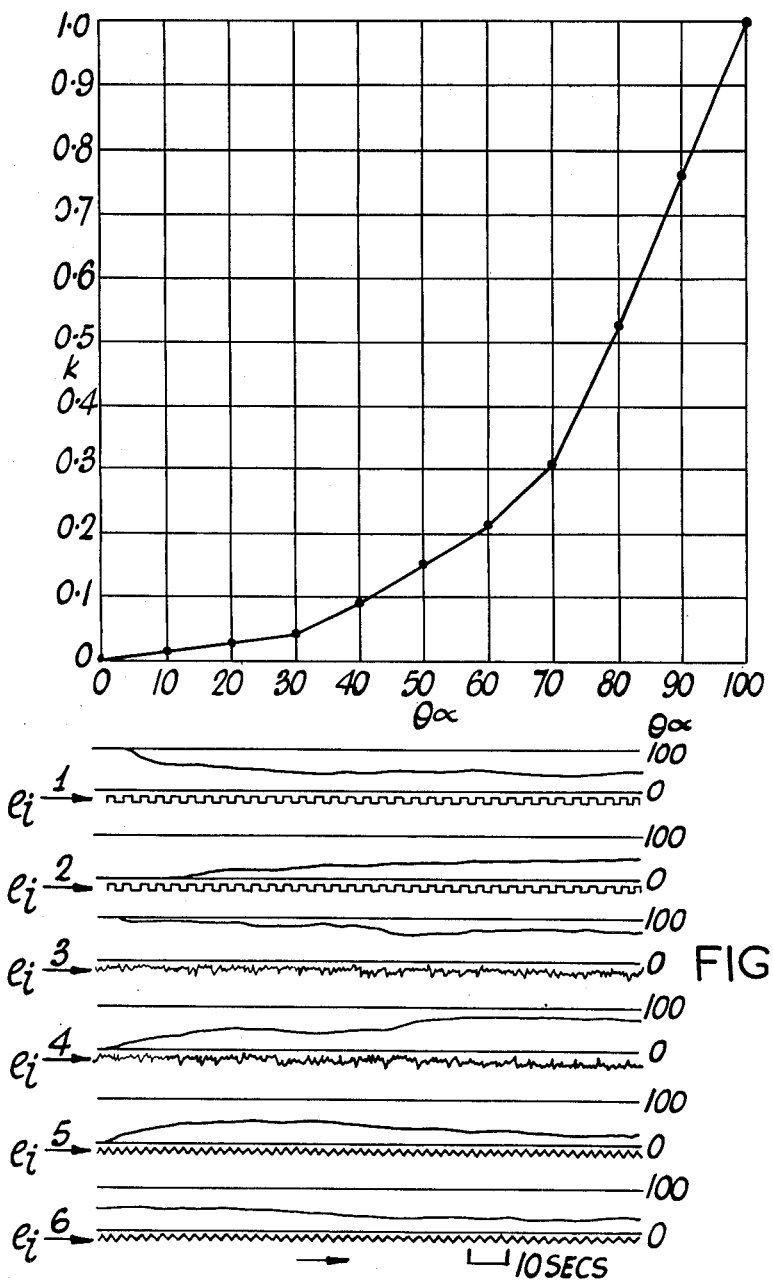

FIGURE 8 is the characteristic representing the variation of K from 0 to 1 as $\theta_a$ varies between 0 and 100. This non-linear characteristic was chosen in preference to a linear one since it equalises the slopes and separates the minima of the characteristics shown in FIGURE 7.

In this example the reference voltage V was 10 volts and the amplifier gain was 6. The value of $n$ was 10 which gives a 9% variation in $\alpha$ or a 4½% variation, above and below the mean value, which is independent of the mean value.

It will be remembered that the signal $f(e)$ contains the frequency components of $|e|$ in the region of the reference signal fundamental frequency. Occasionally there may be some degree of synchronisation between components of the input and reference signal and this may tend to cause interference. Since the reference and input are uncorrelated it was thought improbable that the synchrony would be maintained over many cycles. Also, the error signal components are small in this region and in practice it was found that the changes in $f(e)$ denoted by $\pm \Delta f$ were consistently dependent upon $\Delta \alpha$ as required.

An effective change $\Delta \alpha$ could be produced by a change $$\Delta K = \frac{1}{n}$$

which was equal to 0.1 in the present example as stated above. If the estimated slope of the K, $\theta_a$ characteristic (FIGURE 8) at the optimum value of $$\theta_a \text{ is } \gamma_0 = \left(\frac{\Delta K}{\Delta \theta_a}\right)_0$$

it is found that the equivalent change of $$\theta_a \text{ is } \Delta \theta_a = \frac{0.1}{\gamma_0}$$

At the dynamic optimum the value of $f(e)$ when $R_a$ is connected to the tachometer by switch $S_2$ is equal to the value when $R_a$ is connected to earth and $e_a$ is zero. This condition leads to the following geometrical method of finding the expected dynamic optimum value of $\theta_a$ (denoted by E) from the static characteristic of FIGURE 7.

A horizontal line of length $\Delta \theta_a$ is placed with the left-hand end on the $f_2$, $\theta_a$ characteristic and is made to follow it until the right-hand end meets the rising portion of the same characteristic. The projection of the left-hand end then gives the expected value E.

This construction is shown by dashed lines on the characteristics for the four inputs A—D in FIGURE 7. Thus, for the square wave input A the static optimum is 52 and the slope $$\gamma_A = \frac{1}{160}$$

giving $\Delta_A \theta_a = 16$. The above construction gives $E_A = 46$ and for the other inputs the values are $E_B = 66$, $E_C = 17.5$ and $E_D = 32$.

The dynamic performance of this example under continuous operating conditions is illustrated by FIGURE 9 which shows six double beam oscillograph records. In each of the records 1–6 the lower trace represents the input signal $e_i$ which was either zero or one of the four inputs A–D of FIGURE 7. For the first record $\theta_a$ was initially clamped at 100. The square wave input A was then switched on and after two seconds the clamp was removed. The wiper of variable resistor $P_a$ then followed an approximately exponential curve until, after 50 seconds, $\theta_a$ reached an average value of $M_A = 45$ which was then maintained indefinitely, the fluctuations about this level being approximately 5 units.

A similar procedure was adopted to obtain record 2 except that $\theta_a$ was initially clamped at 0 and released after nine cycles of the square wave. The subsequent change in $\theta_a$ was less rapid and 88 seconds elapsed before the same average optimum level of 45 was attained.

Records 3 and 4 show the results of repeating the above procedures using the random signal B. This signal was obtained by passing a gas filled tetrode noise signal through a simple low pass RC filter with the 3 db. point at $w=1$. A simple description of the changes in $\theta_a$ for these cases is not possible but the decrease of $\theta_a$ in record 3 and the increase of $\theta_a$ in record 4 are almost monotonic for 74 seconds and 94 seconds, respectively, to a level that fluctuates in an irregular manner between 70 and 85 units. It is thought that some of the irregularity in these two records was due to actual changes in the optimum value of $\theta_a$ caused by overloading in the random signal generator as the mean signal drifted. An upward drift was corrected 2.5 seconds from the end of record 3 and $\theta_a$ thereafter descended from 85 to 75 units. The static characteristic for this input signal was only a rough estimate since a steady reading could not be obtained with the filter time constant $R_2 C_2$ of 10 seconds.

Record number 5 starts with zero input and $\theta_a$ clamped at 0. The main control system went into oscillatory motion which ceased almost as soon as the clamp was released and $\theta_a$ increased rapidly to 50 units where it would have remained indefinitely had the input not been changed from zero. When the sinusoidal signal commenced, however, there was a slow decrease to $M_C = 22$.

The last record shows a transition from input A to input D for which $M_D = 33$.

Any instability which occurs with zero input is automatically suppressed since it produces an error signal which is minimised to zero. Thus, the parameter controller ensures stability a few seconds after the system is switched on.

For inputs A, C and D there is close agreement between the measured dynamic optima and the expected values deduced from the static characteristics. For input B the discrepancy of about 10% is thought to be probably due to overloading in the noise generator produced by drift as above mentioned.

The results are summarized as follows:

| Input | E | M | Percent Difference |
|---|---|---|---|
| A | 46 | 45 | 1 |
| B | 66 | 75 | 9 |
| C | 17 | 22 | 5 |
| D | 32 | 33 | 1 |

The approximately exponential approach of $\theta_a$ to the optimum value can be expected from a simple theoretical analysis in which the $f_2(e)$, $\theta_a$ characteristic is assumed to be parabolic. If a new variable $\theta$ is measured from the optimum value of $\theta_a$ we can write $$\frac{df}{d\theta} = c_1 \theta$$

Strong velocity feedback to the parameter control motor makes the rate of change of $\theta$ proportional to $e$ which is in turn proportional to the above partial derivative.

Thus $$\frac{d\theta}{dt} = -c_1 c_2 \theta$$

which for an initial value $\theta_0$ yields $$\theta = \theta_0 e^{-c_1 c_2 t}$$

The optimisation should, therefore, be most rapid for inputs giving errors that the most dependent on the parameter value. To avoid excessive sampling ripple the time constant $$\frac{1}{c_1 c_2}$$

should be long compared with the sampling time $T_s$. This condition was satisfied in the above example by decreasing the value of the velocity feedback resistor $R_v$ until the ripple had the small magnitude shown in record 1 of FIGURE 9.

The reference voltage waveform for the above embodiment of FIGURE 5 is shown in FIGURE 10a and can be regarded as a repeating sequence of single square wave cycles. There is provided during each cycle an estimate of $$\frac{\Delta f}{\Delta \alpha}$$

which is stored in the reservoir capacitor $C_3$ of the peak rectifiers until the next cycle, which, in fact, need not follow immediately.

The next cycle may be delayed by a time $T_r$ as shown in FIGURE 10b. Thus, the intervening time can be used for single cycles to provide estimates of $$\frac{\Delta f}{\Delta \alpha}$$

of other parameters.

The circuit of FIGURE 5, for example, is repeated for each of the set of N parameters to be controlled except, of course, for the position control system. Also, the square wave generator may be common to each parameter control circuit. In this case the generator has a period of $2T_s$ and drives a stepping switch with 2 N contacts supplying N relays. Each relay is connected across two adjacent contacts and the wiper arm of the stepping switch connects each contact to the generator output for $T_s$ seconds. The relay contact $S_1$ of each parameter control circuit that generates the reference voltages as shown in FIGURE 10b has a central, neutral position at earth potential at which the switch is maintained when the relay is unenergised, but is driven first to $+V$ and then to $-V$ contacts as the selector switch wiper passes the pair of associated coil terminals. In the above example of the velocity feedback parameter the $S_2$ contact of its relay connects $R_a$ to earth when $S_1$ is at V and to the tachometer when $S_1$ is at $-V$ or earth.

The absence of the reference signal between the samples renders the peak rectifiers inoperative and the parameter control signals $e_{a1}, e_{a2}, \ldots e_{an}$ are therefore sampled estimates of the partial derivatives of $f_2(e)$ at the working point as required.

It will be seen that as the number of parameters to be controlled is increased there is necessarily a longer time in attaining optimum operation. However, the optimum operation so obtained is clearly a truer optimum and, in fact, in many applications such delay may be of small importance compared to the benefits of the optimum operation obtained.

I claim:

1. In a control system having at least one controllable parameter affecting a dependent variable which is required to be optimised, means for controlling at least said one parameter comprising means for continuously producing periodical small variations in the value of said parameter about a mean value, means for deriving a signal defining the sense in which the variable varies in response to each said small variation and means responsive to the signal so derived for changing the means value of said parameter in the appropriate sense to optimise said variable.

2. Control system the response of which is required to be controlled towards a desired optimum under the influence of a plurality of response determining parameters including means for controlling at least one of said parameters said means comprising means for varying said parameter, means for providing a response signal representative of the response of the system, means for continuously producing small periodical variations of said parameter about a mean, means for detecting the sense in which said response signal varies in response to said small variations of said parameter and generating a test signal representative thereof and means for adjusting said parameter controlling means in response to said test signal.

3. Control system in which a controlled condition is required to be controlled towards a desired optimum under the influence of at least one parameter of controllable magnitude comprising means for setting up a determining magnitude signal for control of at least said one parameter, means for continuously varying said control signal by small periodic variations from a mean, means for detecting variations in said controlled condition in response to the variations of said control signal and for setting up a test signal representing the sign and magnitude of the variations so detected and means for applying said test signal to vary the mean value of said control signal in the direction towards optimisation of said condition.

4. System as claimed in claim 3 comprising means for integrating a signal representing the variation of said controlled condition over a period during which the parameter is varied in one sense, means for integrating a signal representing the variation of said controlled condition over a like period during which the parameter is varied in the reverse sense, means for deriving a signal representing the difference of said two integrations and means for applying the difference signal so derived as said test signal to vary in the appropriate sense the mean value of said magnitude determining control signal.

5. System as claimed in claim 4 including a resistance network from which said magnitude determining control signal is derived, switch means operable periodically to connect said resistance network alternately to different voltage sources whereby to vary said magnitude determining control signal about a mean and further switch means operated synchronously with said first named switch means for switching integrating means between two alternative regimes whereby each variation of said control signal is related to a different regime of said integrating means.

6. System as claimed in claim 5 wherein said integrating means comprises a resistance/capacity network connected symmetrically about a point switched alternately between two poles of a reference voltage by said second switching means.

7. System as claimed in claim 5 wherein said integrating means comprises an integrating motor switched for operation first in one sense and then in the reverse sense by said second switching means.

8. Control system in which a controlled condition is required to be controlled towards a desired optimum under the influence of a plurality of parameters including means for controlling a plurality of said parameters said means comprising means for providing a signal representative of said controlled condition and for each parameter of said plurality means for varying said parameter, means for producing small periodical variations of said parameter about a mean, means for detecting the sense in which said representative signal varies in response to said small variations of said parameter and generating a test signal and means for adjusting said parameter controlling means in response to said test signal, there being provided also means for rendering each of said parameter controlling means operative in turn in a predetermined sequence.

9. Control system as claimed in claim 8 wherein said system comprises a forward signal path and a feedback signal path, means for adding the output signal of said feedback path to an input signal to provide an error signal, which error signal comprises said representative signal.

10. Position control system comprising a controlling member, a forward signal path including an amplifier, a motor, a controlled member driven by said motor in accordance with the output of said amplifier a tachometer generator driven by said motor and providing a feedback signal proportional for the velocity of said motor, means for providing a feedback signal related to the position of said controlled member and means for combining at the input to said amplifier a signal from said controlling member and said feedback signals to form an error signal, wherein said velocity feedback signal is fed through a feedback path including a resistance network in which are provided means for selecting a portion of said velocity feedback signal and switch means for periodically varying the level of the feedback signal fed back above and below the selected portion, there being provided also means for operating upon said error signal to derive therefrom a signal representing the sense and rate of change of said error signal and means for applying said last named signal to control the portion of said velocity feedback signal selected.

11. System as claimed in claim 10 wherein the means for operating on said error signal includes phase-sensitive rectifier means including switch means operating in synchronism with the switch means in said feedback path.

References Cited in the file of this patent

UNITED STATES PATENTS

| | | |
|---|---|---|
| 2,862,167 | Curry | Nov. 25, 1958 |
| 2,940,026 | Raque | June 7, 1960 |
| 2,941,139 | Marx | June 14, 1960 |